DE FOREST L. RATHBONE.
COMBINATION CLOSET SEAT AND BIDET.
APPLICATION FILED FEB. 9, 1920.
1,346,252.
Patented July 13, 1920.
2 SHEETS—SHEET 1.
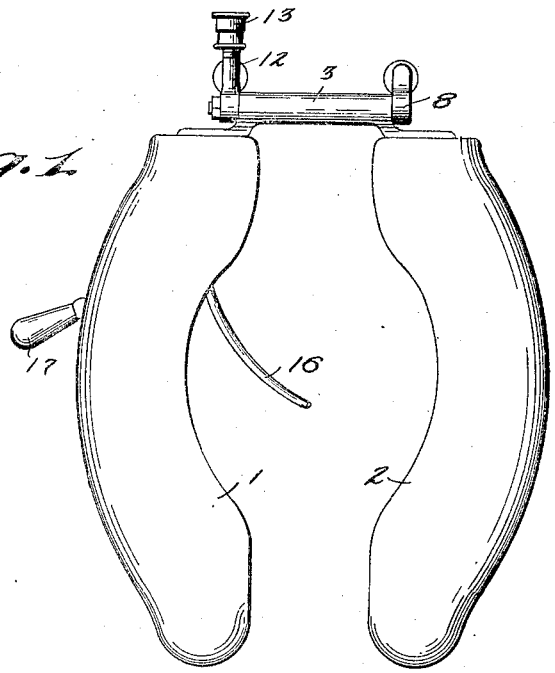
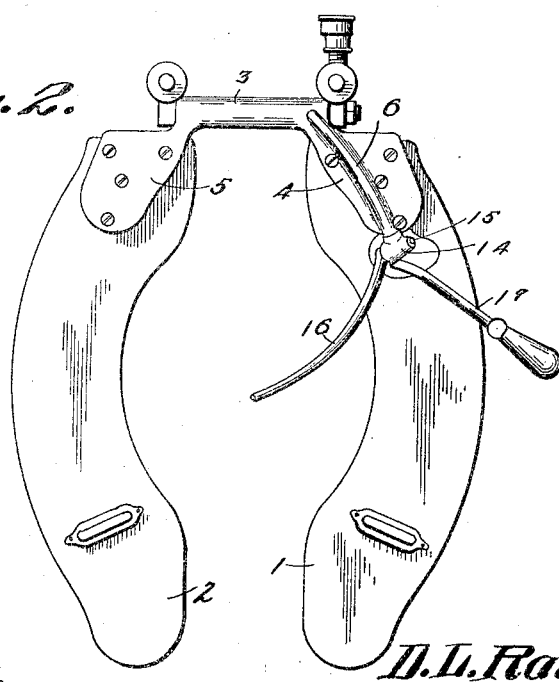
INVENTOR
D. L. Rathbone
BY
ATTORNEYS DE FOREST L. RATHBONE.
COMBINATION CLOSET SEAT AND BIDET.
APPLICATION FILED FEB. 9, 1920.
1,346,252.
Patented July 13, 1920.
2 SHEETS—SHEET 2.
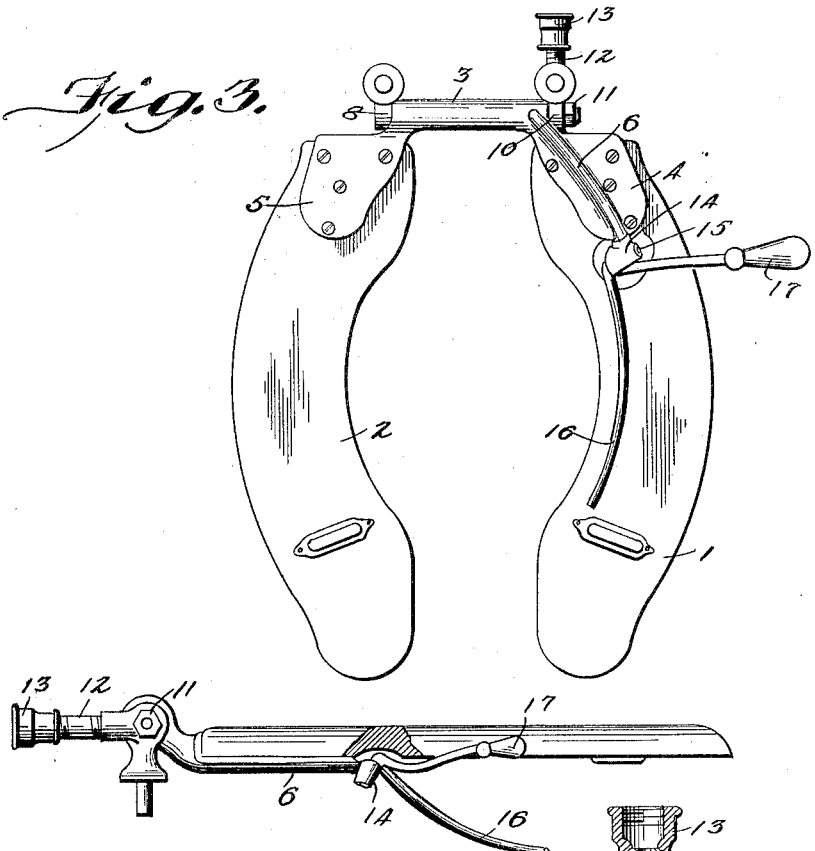
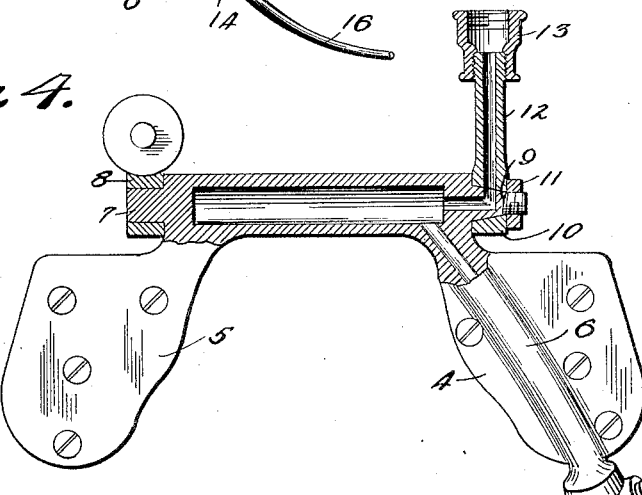
WITNESSES
INVENTOR
D. L. Rathbone
BY
ATTORNEYS

UNITED STATES PATENT OFFICE.

DE FOREST LISLE RATHBONE, OF JACKSONVILLE, FLORIDA.

COMBINATION CLOSET-SEAT AND BIDET.

1,346,252.   Specification of Letters Patent.   Patented July 13, 1920.

Application filed February 9, 1920. Serial No. 357,387.

*To all whom it may concern:*

Be it known that I, DE FOREST LISLE RATHBONE, a citizen of the United States, and resident of Jacksonville, in the county of Duval and State of Florida, have invented certain new and useful Improvements in Combination Closet-Seats and Bidets, of which the following is a specification.

My invention is an improvement in combination closet seats and bidets, and has for its object to provide a device of the character specified, capable of use in the ordinary manner as a seat, and having a bidet or douche fixture in connection therewith, connected with the water supply and normally in inoperative position, and concealed by the seat but capable of being brought into operative position when desired.

In the drawings:

Figure 1 is a top plan view of the seat with the douche fixture in operative position;

Fig. 2 is a bottom plan view;

Fig. 3 is a view similar to Fig. 2, showing the douche in inoperative position;

Fig. 4 is a side view of the seat with parts broken away; and

Fig. 5 is a horizontal section through the seat hinge.

In the present embodiment of the invention the seat, which however may be of any desired construction consists of two similar portions 1 and 2, which are connected by a hollow bar or casing 3, having leaves 4 and 5 at its ends, which fit upon the under faces of the seat section and are secured thereto by screws or the like, as shown. A bore indicated at 6 extends from one end of the bar 3 in the hinge leaf 4 to that end of the leaf remote from the bar and this bore communicates with the bore of the bar. At that end of the bar remote from the bore 6 there is provided a journal pin 7 which engages a fixed bearing ring 8 held on the bowl or in any other suitable manner, and this end of the bore of the bar is closed as shown. At its opposite end the bar has a reduced tapering stem 9 which is received within a similarly-shaped opening in the other bearing ring 10, also connected with the bowl or in any other suitable manner and a nut 11 is threaded onto the stem outside of the ring, as shown.

The journal pin 9 has a more or passage communicating with the hollow of the bar, and the said passage extends to the periphery of the tapering stem, as shown, where it registers with the opening of the pipe 12 integral with the bearing ring, and extending rearwardly therefrom. This pipe 12 at the end remote from the bar has a union 13, by means of which it may be connected to a water supply.

The leaf 4 carries at the end of the bore 6 a casing 14, which has a tapering bore for receiving a valve plug 15. This casing 14 is a valve casing, and the plug 15 has connected therewith a discharge pipe 16 and a handle member 17, the handle member having a grip, as shown.

The pipe 16 is curved longitudinally, as shown, so that when in inoperative position it will lie along the under face of the seat portion 1 and be concealed beneath said seat portion, and the handle is so arranged that it will extend laterally beyond the outer edge of the seat portion 1, as shown in Fig. 3. By swinging the handle in the proper direction, the discharge pipe 16 may be thrown into the position of Figs. 1 and 2 so that the free end thereof is in position for use. The said free end may be supplied with suitable nozzles if desired, and it will be obvious that the nozzles might be connected to the pipe 16 by a flexible pipe.

In use, the seat is used in the ordinary manner as a seat. When it is desired to use the douche, the handle is swung to bring the discharge pipe in the position of Figs. 1 and 2, and without leaving the seat the occupant can use the douche. Preferably the pipe 16 has a spray nozzle at its discharge end.

I claim:

1. In combination, a seat for the closet bowl consisting of separated sections connected at the hinged end by a hollow bar, said bar having a water connection at one end and having an extension extending along the under side of one of the said portions, said extension having a valve casing at the end remote from the bar and a valve plug in the casing, said valve plug having a handle and a discharge tube so arranged that when the handle is swung in the proper direction the discharge tube will be moved with its free end in position on the said section for use.

2. A seat for closet bowls, having at the hinge thereof a chamber provided with water connections and with an extension lying on the under side of the seat at one side of the opening thereof, a valve at the end of the extension for controlling the flow through the extension, said valve having a handle for turning the same and a discharge pipe adapted to be moved into position beneath the seat and away from the central opening or in position within said opening for use as a douche.

3. A seat for closet bowls having at the hinge thereof a chamber provided with water connections and with a discharge pipe adapted to lie beneath the seat away from the opening therethrough and movable with respect to the chamber to be swung into the said opening and a common means for swinging the discharge pipe and for controlling the flow of the water therethrough.

DE FOREST LISLE RATHBONE.